United States Patent [19]

Fukaya

[11] Patent Number: 4,848,554
[45] Date of Patent: Jul. 18, 1989

[54] INTERMEDIATE PLATE POSITIONING MECHANISM FOR TWIN CLUTCH

[75] Inventor: Yasunobu Fukaya, Hirakata, Japan

[73] Assignee: Kabushiki Kaisha Daikin Seisakusho, Osaka, Japan

[21] Appl. No.: 233,646

[22] PCT Filed: Dec. 8, 1987

[86] PCT No.: PCT/JP87/00953

§ 371 Date: Jun. 20, 1988

§ 102(e) Date: Jun. 20, 1988

[87] PCT Pub. No.: WO88/04372

PCT Pub. Date: Jun. 16, 1988

[30] Foreign Application Priority Data

Dec. 8, 1986 [JP] Japan .................................. 61-188983

[51] Int. Cl.$^4$ ............................................. F16D 13/54
[52] U.S. Cl. ............................ 192/70.25; 192/111 A
[58] Field of Search .......................... 192/70.25, 111 A; 188/196 P

[56] References Cited

U.S. PATENT DOCUMENTS

| | | | |
|---|---|---|---|
| 3,561,577 | 2/1971 | Binder | 192/111 A |
| 3,797,622 | 3/1974 | Wörner et al. | 192/111 A |
| 4,601,373 | 7/1986 | Després et al. | 192/70.25 |
| 4,640,399 | 2/1987 | Börjesson | 192/70.25 |
| 4,640,400 | 2/1987 | Nakane et al. | 192/111 A |
| 4,684,002 | 8/1987 | Takeuchi | 192/111 A |
| 4,715,484 | 12/1987 | Flotow | 192/70.25 |
| 4,742,901 | 5/1988 | Takeuchi et al. | 192/70.25 |
| 4,751,990 | 6/1988 | Schraut et al. | 192/70.27 |

Primary Examiner—Rodney H. Bonck
Assistant Examiner—Andrea Pitts
Attorney, Agent, or Firm—Armstrong, Nikaido, Marmelstein, Kubovcik & Murray

[57] ABSTRACT

An intermediate plate positioning mechanism for a twin clutch, in which a seat (30) parallel with a clutch axis is provided on an outer peripheral part of an intermediate plate (9), a sliding plate (31) is applied on a seat (30) in an manner as slidable only in a clutch axis direction, a bolt (33) is screwed in the seat (30) through a slotted hole (32) made on the sliding plate (31) and longitudinal in the clutch axis direction, a coned disc spring (36) for controlling a sliding resistance of the sliding plate (31) is compressively installed between the sliding plate (31) and a bolt head (33a), and a clearance (L1) corresponding to a return length of the intermediate plate (9) for clutch engagement is produced between one end of the sliding plate (9) and a spacer (5) at time of clutch engagement where the intermediate plate (9) moves toward the flywheel (2) side to cause the other end of the sliding plate (31) to contact with the flywheel (2).

6 Claims, 3 Drawing Sheets ved in a direction of arrow VI of FIG. 5, and FIG.

INTERMEDIATE PLATE POSITIONING MECHANISM FOR TWIN CLUTCH

TECHNICAL FIELD

This invention relates to an intermediate plate positioning mechanism for a twin clutch etc. employed mainly for heavy duty vehicles such as an industrial vehicle and a large-size vehicle.

BACKGROUND ART

FIG. 5 is a vertical sectional view of a general twin clutch, FIG. 6 is a partially fragmental side view viewed in a direction of arrow VI of FIG. 5, and FIG. 7 is a bottom view viewed in a direction of arrow VII of FIG. 6. In FIG. 5, a twin clutch 1 is disposed between an input side flywheel 2 and an output side clutch shaft (center line 3). The flywheel 2 is fastened to a crank shaft end by plural bolts 4, and a spacer (flywheel ring) 5 forming an outer shell of the twin clutch 1 and a clutch cover 6 are fastened by common bolt 7 to an outer peripheral part of the flywheel 2. In the twin clutch 1; a first clutch disc 8, an intermediate plate 9, a second clutch disc 11 and a pressure plate 12 are disposed successively form the flywheel 2 side. The first and second clutch discs 8 & 11 spline fit onto the clutch shaft 3 (an input shaft of transmission) at their central hub portions. The intermediate plate 9 is coupled to the spacer 5 through a strap 13 extending in a circumferential direction, and the pressure plate 12 is coupled to the clutch cover 6 through a strap 14 (FIG. 6) extending samely in the circumferential direction. Plural clutch springs 16 are compressively installed between the pressure plate 12 and the clutch cover 6, and at the same time release levers 17 for disengaging the clutch are assembled radially. The release lever 17 is supported by the clutch cover 6 through a pin 18 and a lever support 19, and at the same time connected to a projection 21 of the pressure plate 12 through the pin 20. A spring force of the clutch spring 16 causes a facing 22 at an outer periphery of the first clutch disc 8 to be held between the flywheel 2 and the intermediate plate 9, and it causes a facing 23 of the second clutch disc 11 to be held between the intermediate plate 9 and the pressure plate 12.

When a clutch pedal (not shown) is operated to push forth the release lever 17 to a position 17' in a clutch disengaging process, the pressure plate 12 is moved backward by a lever action of the release lever 17 to a right side of FIG. 5 against the spring force of the clutch spring 16, so that the facing 23 is released. And at the same time, the intermediate plate 9 is moved backward by a spring force of the strap 13 to the right side of FIG. 5 to an amount restricted by an intermediate plate positioning mechanism described later, so that the facing 22 is released.

A conventional intermediate plate positioning mechanism will be described hereunder. Conventionally, as illustrated in FIG. 7, a stopper pin 25 is press fitted in a hole 27 of a boss 26 at an outer periphery of the intermediate plate 9, one end of the stopper pin 25 faces on the flywheel 2 and the other end thereof faces on the spacer 5, and a length of the stopper pin 25 is so defined that a specified clearance L1 is made between the stopper pin 25 and the spacer 5 at the time when the clutch is engaged as shown by FIG. 7. The stopper pin 25 is a so-called split pin which is made of a rectangular spring steel plate formed into a cylindrical shape so that a slit 28 extending in its longitudinal direction may be formed even when the pin is press fitted in the hole 27.

When the facing 23 is moved backward in a left upper side of FIG. 7 in the clutch disengaging process, the intermediate plate 9 is moved backward by the spring force of the strap 13 in the same direction to an amount of the clearance L1 (disengagement allowance) so as to release the facing 22. When the facing 22 is worn out, the intermediate plate 9 slides on the stopper pin 25 at a part of the hole 27 in a right lower side of FIG. 7 at the time of clutch engagement where the intermediate plate 9 moves forward in the right lower direction of FIG. 7. Consequently, the intermediate plate 9 is able to give a specified load on the facing 22 and at the same time to provide the specified disengagement allowance through the backward motion of the clearance L1 when disengaging the clutch. Thus, the specified disengagement allowance can always be secured in relation to the facing 22.

According to the above-mentioned conventional structure, however, the stopper pin 25 is affected by heat to cause an instability of load (sliding resistance) at time of the stopper pin 25 sliding relatively to the hole 27 so that a pressing force by which the intermediate plate 9 presses the facing 22 on the flywheel 2 fluctuates to an extent of said instable load. Namely, since the hole 27 in which the stopper pin 25 fits is made on the outer peripheral boss 26 of the intermediate plate 9 having friction surfaces with the facings 22 & 23 on both sides thereof, friction heat is transmitted directly to the hole 27 and the stopper pin 25 so that fluctuation of outside diameters of the hole 27 and the stopper pin 25 and deterioration of spring characteristic of the stopper pin 25 etc. due to the heat become inevitable. Therefore, the foregoing trouble will naturally arise.

The present invention has an object to solve the above-mentioned conventional problem by thermally isolating the spring member from the intermediate plate which is apt to acuire a high temperature during operation and at the same time by employing as the spring member a coned disc spring developing a less load change in relation to a deflection change.

DISCLOSURE OF INVENTION

In a twin clutch having a spacer fastened to a flywheel, a clutch cover fastened to the spacer, an intermediate plate supported by the spacer through a strap and pressing a facing of a first clutch disc on the flywheel, and a pressure plate supported by the clutch cover through a strap and pressing a facing of a second clutch disc on the intermediate plate; this invention relates to an intermediate plate positioning mechanism for the twin clutch, in which a seat parallel with a clutch axis is provided on an outer peripheral part of the intermediate plate, a sliding plate is applied on the seat in a manner as slidable only in a clutch axis direction, a bolt is screwed in the seat through a slotted hole made on the sliding plate and longitudinal in the clutch axis direction, a coned disc spring is compressively installed between the sliding plate and a bolt head, and a clearance corresponding to a return length of the intermediate plate for clutch disengagement is produced between one end of the sliding plate and the spacer at time of clutch engagement where the intermediate plate moves toward the flywheel side to cause the other end of the sliding plate to contact with the flywheel.

BEST MODE FOR CARRYING OUT THE INVENTION

Figure 1:
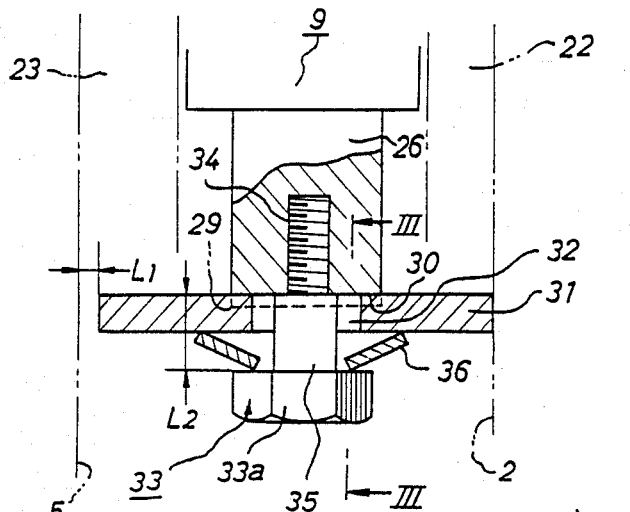
FIG. 1 is a partially sectional vertical bottom view.
Figure 3:
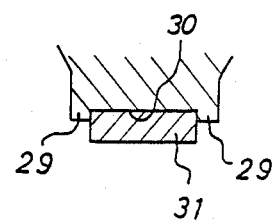
FIG. 3 is a sectional view taken along the line III—III of FIG. 1.
Figure 2:
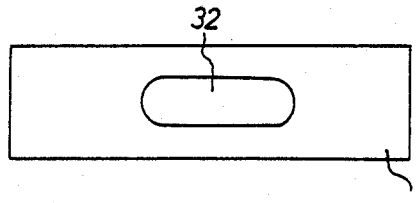
FIG. 2 is a plan view of a sliding plate of FIG. 1.

In FIG. 1, a seat 30 comprising a surface parallel with a clutch axis is formed at a tip end of a boss 26 provided integrally on an outer periphery of an intermediate plate 9. A pair of edges 29 (FIG. 3) extending samely in the clutch axis direction are provided on both sides of the seat 30 to form a shallow U-shape groove, and a rectangular sliding plate 31 is fitted in this groove. One end of the sliding plate 31 is made face on a flywheel 2 and the other end thereof is made face on a spacer 5 respectively, and a clearance L1 (2.6 mm for example) corresponding to a disengagement allowance is provided between the sliding plate 31 and the spacer 5 at the time of clutch engagement. The sliding plate 31 has a slotted hole 32 (FIG. 2) longitudinal in the clutch axis direction, and a stepped bolt 33 is screwed through this slotted hole 32 into a threaded hole 34 of the boss 36. The bolt 33 has a large-dia. stem 35 (length: L2) so that a distance between a bolt head 33a and the seat 30 is set to a specified value by the length L2 of the large-dia. stem 35 so as to give a specified deflection to a coned disc spring 36 compressively installed between the bolt head 33a and the sliding plate 31. The range of the deflection of the above-mentioned coned disc spring is demensioned such that the spring load scarcely changes even when the deflection changes to some extent because of a characteristic of the coned disc spring. Further, a range of the spring load given by the coned disc spring 36 to the sliding plate 31 is dimensioned such that the sliding plate 31 can move backward to a left side of FIG. 1 on the seat 30 by a wear amount of the facing in the clutch engagement stroke, and the sliding plate 31 does not slide on the seat 30 even when the intermediate plate 9 moves backward by the disengagement allowance L1 to cause the sliding plate 31 to strike against the spacer 5.

Figure 5:
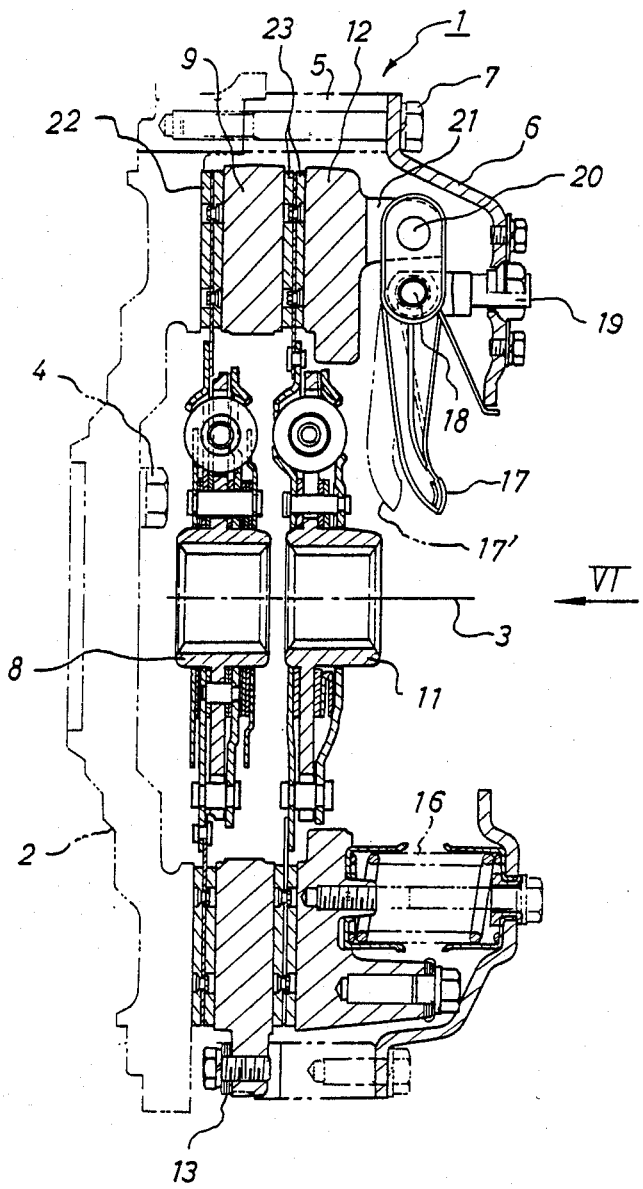
FIG. 5 is a vertical sectional view of a general twin clutch.
Figures 6, 7:
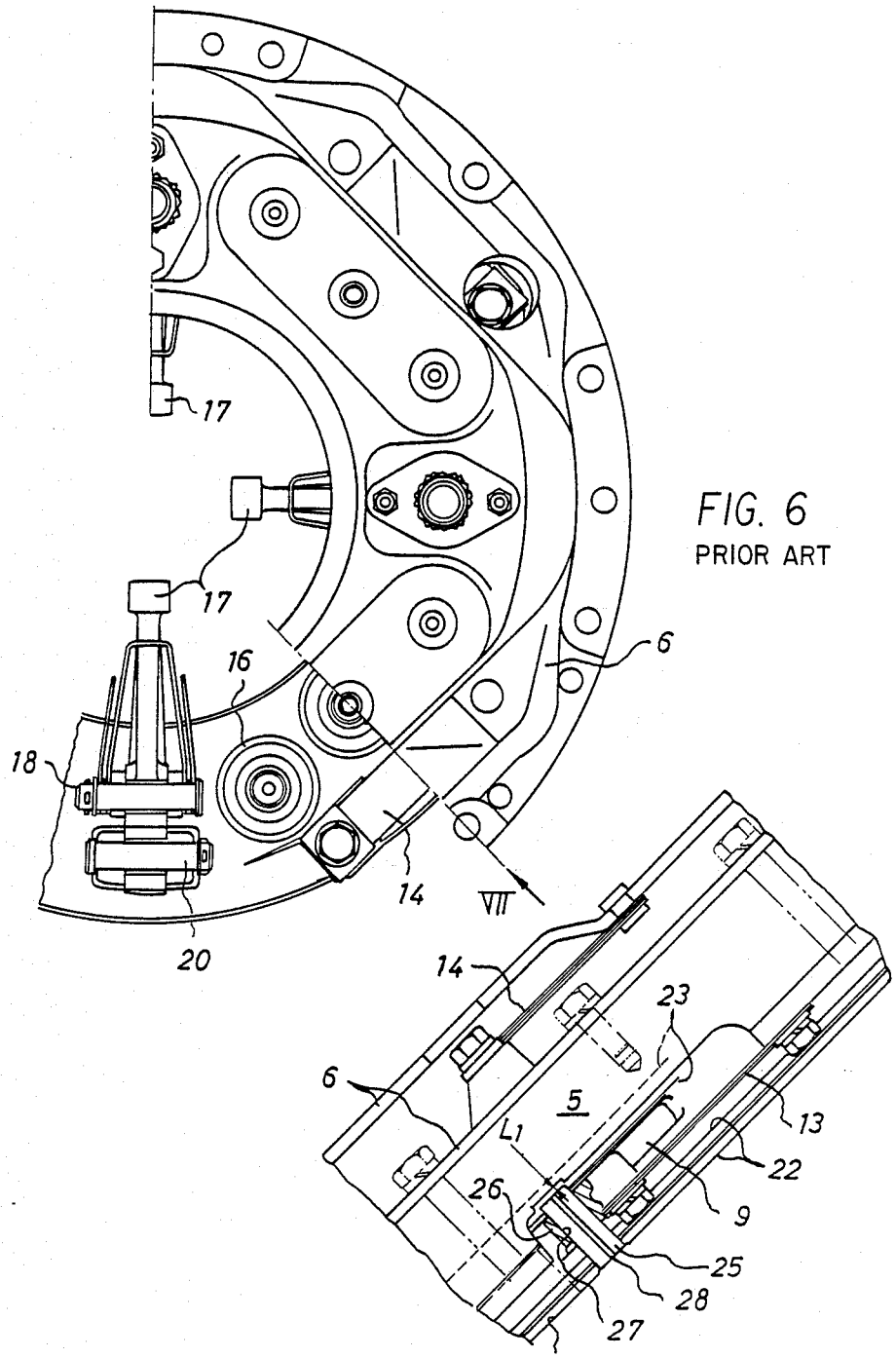
FIG. 6 is a partially fragmental view viewed in a direction of arrow VI of FIG. 5.
FIG. 7 is a bottom view viewed in a direction of arrow VII of FIG. 6.

Function will be described hereunder. When the intermediate plate 9 is released in the clutch disengagement stroke, the intermediate plate 9 is moved by a working of the strap 13 (FIG. 5) to the left side of FIG. 1, and its moving distance (disengagement allowance) gets to the clearance L1. Then, when the intermediate plate 9 is pushed to a right side of FIG. 1 in order to engage the clutch, the intermediate plate 9 presses a facing 22 on the flywheel 2, and at the same time, the sliding plate 31 contacts with and presses on the flywheel 2. In this instance, the sliding plate 31 moves backward to the left side of FIG. 1 on the seat 30 by a length corresponding to the wear amount of the facing 22. Thereby, a constant disengagement allowance can be obtained. A part of heat of the intermediate plate 9 is transmitted through the sliding plate 31 to an outer peripheral part of the coned disc spring 36, and a part of remaining heat is transmitted through the bolt 33 to an inner peripheral part thereof, respectively.

According to the above-mentioned structure, the following effect will be obtainable. Namely, in the present invention, the seat 30 parallel with the clutch axis is provided on the outer peripheral part of the intermediate plate 9, the sliding plate 31 is applied on the seat 30 in the manner as slidable in the clutch axis direction, the bolt 33 is screwed into the seat 30 through the slotted hole 32 provided on the sliding plate 31 and longitudinal in the clutch axis direction, and the coned disc spring 36 is compressively installed between the sliding plate 31 and the bolt head 33a; so that the sliding resistance of the sliding plate 31 is defined by the spring load of the coned disc spring 36 and the sliding load (setting load) becomes more stabilized than that of the conventional stopper pin system. Namely, since the load scarcely changes within the range of specified deflection in the coned disc spring, the stabilized load can be always given to the sliding plate 31 even if a thickness of the sliding plate 31 and a temperature of the coned disc spring 36 change due to heat of the intermediate plate 9, so that the foregoing advantage becomes obtainable. Further, the coned disc spring 36 does not develop a considerable temperature rise because it does not contact directly with the intermediate plate 9 of high temperature, so that the load characteristic shows little change to provide the stabilized spring characteristic also from the standpoint of this aspect.

Figure 4:
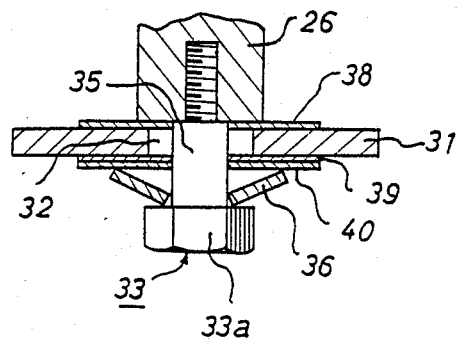
FIG. 4 is a view corresponding to FIG. 1 for illustrating another embodiment.

In FIG. 4, 38 & 39 are friction materials and 40 is a friction plate. According to this structure, the load of the coned disc spring 36 can be transmitted to the sliding plate 31 over a wide area so that a pressure per unit area can be reduced and the sliding load can be stabilized. Moreover, since metal-to-metal sliding contact can be avoided owing to the friction materials, 38, 39, the sliding load can be stabilized also from the standpoint of the aspect.

INDUSTRIAL APPLICABILITY

The foregoing intermediate plate positioning mechanism for the twin clutch according to the invention is useful when employed for the twin clutches of heavy duty vehicles such as an industrial vehicle and a large size vehicle etc.

What is claimed is:

1. In a twin clutch having a spacer (5) fastened to a flywheel (2), a clutch cover (6) fastened to the spacer (5), an intermediate plate (9) supported by the spacer (5) through a strap (13) and pressing a facing (22) of a first clutch disc (8) on the flywheel (2), and a pressure plate (12) supported by the clutch cover (6) through a strap (14) and pressing a facing (23) of a second clutch disc (11) on the intermediate plate (9); an intermediate plate positioning mechanism for the twin clutch, in which a seat (30) parallel with a clutch axis is provided on an outer peripheral part of the intermediate plate (9), a sliding plate (31) is applied on the seat (30) in an manner as slidable only in a clutch axis direction, a bolt (33) is screwed in the seat (30) through a slotted hole (32) made on the sliding plate (31) and longitudinal in the clutch axis direction, a coned disc spring (36) for controlling a sliding resistance of the sliding plate (31) is compressively installed between the sliding plate (31) and a bolt head (33a), and a clearance (L1) corresponding to a return length of the intermediate plate (9) for clutch disengagement is produced between one end of the sliding plate (9) and the spacer (5) at time of clutch engagement where the intermediate plate (9) moves toward the flywheel (2) side to cause the other end of the sliding plate (31) to contact with the flywheel (2).

2. An intermediate plate positioning mechanism for a twin clutch as set forth in claim 1, in which the bolt (33) is a stepped bolt having a large-dia. stem (35) defining a distance between the head (33a) and the seat (30).

3. An intermediate plate positioning mechanism for a twin clutch as set forth in claim 1, in which the sliding plate (31) fits in a groove in a bottom surface of which is composed of the seat (30).

4. An intermediate plate positioning mechanism for a twin clutch as set forth in claim 1, in which a spring force of the coned spring (36) is set to such a magnitude that the sliding plate (31) is able to slide on the seat (30) toward the spacer (5) side by a distance corresponding to a wear amount of the facing (22) of the first clutch disc (8) only at time of clutch engagement.

5. An intermediate plate positioning mechanism for a twin clutch as set forth in claim 1, wherein a friction material is interposed between the sliding plate (31) and the seat (30).

6. A intermediate plate positioning mechanism for a twin clutch as set forth in claim 1, wherein a friction material (39) is interposed between the coned disc spring (36) and the sliding plate (31).

* * * * *